May 22, 1956     H. W. HOOGENDOORN     2,746,769
KNOCKDOWN BICYCLE FRAME
Original Filed Feb. 25, 1952

Harold W. Hoogendoorn
INVENTOR,

BY
Bernard P. Miller
ATTORNEY

United States Patent Office 2,746,769
Patented May 22, 1956

2,746,769

KNOCKDOWN BICYCLE FRAME

Harold W. Hoogendoorn, Ponca City, Okla.

Substituted for abandoned application Serial No. 273,174, February 25, 1952. This application July 20, 1953, Serial No. 369,076

1 Claim. (Cl. 280—287)

The present application is a substitute application for my application Ser. No. 273,174, under similar title, which was filed February 25, 1952, and which through inadvertence, and without intention to abandon the same, became abandoned on April 24, 1953.

The present invention relates to bicycles, and more particularly to bicycle frame construction wherein disassembly into two principal sections is made possible.

The principal object of the present invention is to provide a sectional bicycle which may be easily and quickly disassembled for compact storage or shipment.

A further object is to provide a sectional bicycle which may be easily and quickly assembled by hand without the use of any tools.

An additional object is to provide a "knock-down" bicycle frame which is substantially as strong and sturdy as conventional single-piece bicycle frames.

Other objects will be apparent from the following description when taken in conjunction with the accompanying single sheet of drawings, wherein.

Like characters of reference designate like parts in those figures of the drawings in which they occur.

Figure 2:
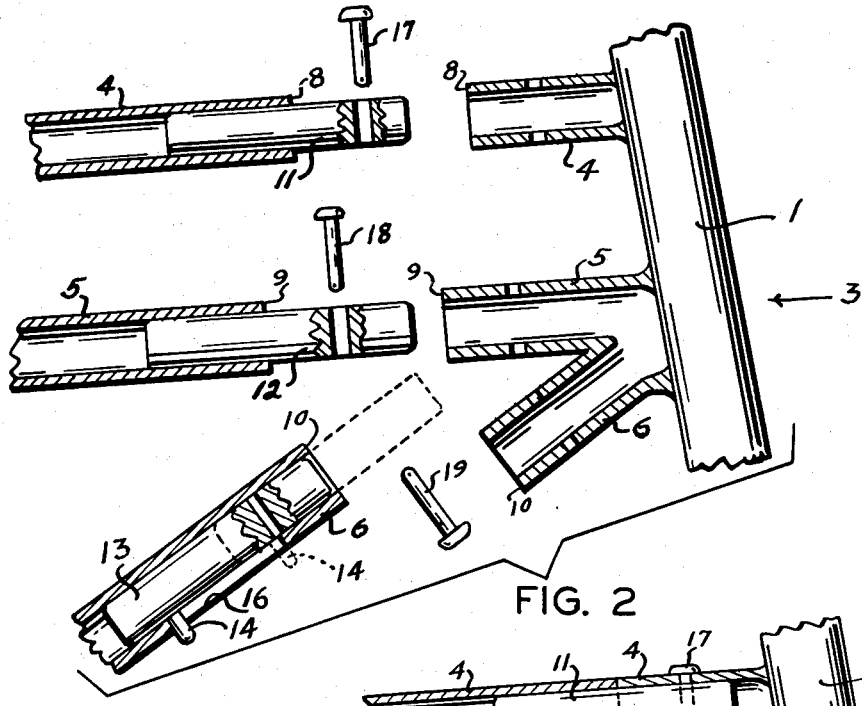
Figure 2 is an enlarged exploded fragmentary vertical sectional view, showing the parts associated with the improved portion of the frame drawn apart, and ready for assembly together; and, Figure 3 is an enlarged fragmentary vertical sectional view showing the parts in assembled condition.
Figure 3:
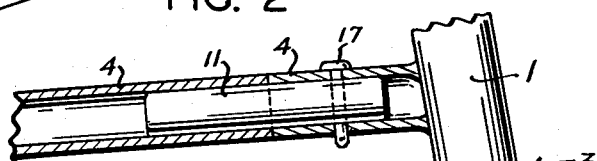
Figure 3:
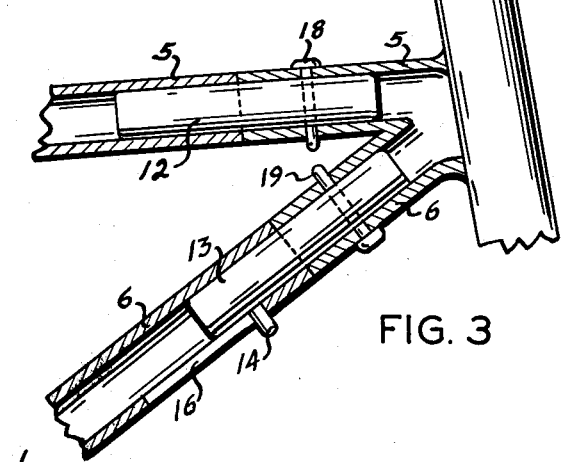
Figure 1:
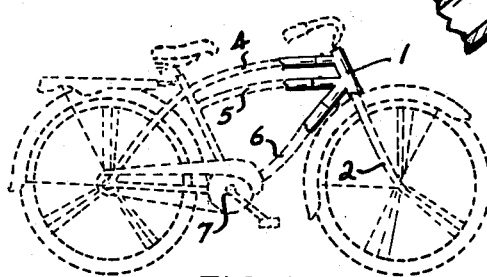
Figure 1 is a side elevational view of a conventional bicycle, the major portion of which is shown in dotted lines, and is shown in solid lines.

The bicycle illustrated in the drawings has a conventional tubate head 1 within which a steering post, not shown, of the front forks 2, is journalled for rotation. The head 1 forms the front member of a frame section 3 having two substantially parallel horizontal frame elements or bars 4 and 5 which are tubate, and the forward ends of which are integrated to the head 1. The frame section 3 also includes a slanting tubate element or truss 6 which extends from the head 1 downwardly and rearwardly toward a conventional sprocket hub 7.

In carrying out the invention, the frame elements 4, 5 and 6 are each severed a short distance behind the head 1, so that the remainder of the frame constitutes a rear separable section. The reference numerals 8, 9 and 10 indicate the respective lines of severance of the frame members 4, 5 and 6. Metal dowel-pins 11 and 12 are welded within one section each of the two frame elements 4 and 5, and the pins protrude in a forward direction beyond the severed ends of the frame sections 4 and 5, as shown.

The lower or rear section of the slanting frame element 6 has a sliding bolt 13 mounted in its upper forward end, and the bolt 13 has a lateral projection 14 which projects through an elongated slot 16 in the wall of the element 6.

In assembling the rear frame section with the front or head section 3, the bolt 13 is first slid to the lower or rearward end of its travel. The forwardly projecting ends of the two pins 11 and 12 are thrust into the forward portions of the frame elements 4 and 5 respectively. This brings the two adjacent ends of the slanting element 6 into aligned registration with each other. The bolt 13 is then slid upwardly into the forward section of the slanting frame element 6.

The frame elements 4, 5 and 6, the dowel pins 11 and 12, and the bolt 13 are alignedly bored transversely to receive, respectively anchor pins 17, 18 and 19, which are thrust into place after the frame sections have been interengaged as above described.

It is thought to be obvious that the two sections of the above described frame construction may be easily and quickly assembled and disassembled, and that the construction is strong and sturdy.

While the descriptive matter hereinabove mentions only "bicycles," and although the accompanying drawings illustrate only a bicycle frame, it is obvious that the invention may well be applied to any two-wheeled frame, for instance, motor cycles, scooters, and the like. The word "bicycle" as used herein is intended to mean any two-wheeled vehicle.

Obviously the invention is susceptible to some change or alteration without defeating its practicability, and I therefore do not wish to be confined to the preferred embodiment shown in the drawings and described herein, further than I am limited by the scope of the appended claim.

I claim:

A knockdown bicycle frame comprising a tubular steering post head, a pair of substantially horizontal elongated tubular bars rigidly secured to said steering post head and extending rearwardly therefrom, an elongated tubular truss member rigidly secured to said head and extending rearwardly and downwardly therefrom, said tubular bars and said tubular truss members each being formed in two parts forming front and rear sections, said front sections being substantially shorter than said rear sections and terminating relatively close to said steering post head, dowel pins rigidly disposed axially in the rear sections of said tubular bars and being slidably received in said front sections of said tubular bars, said dowel pins and said front sections of said tubular bars having aligned apertures therethrough, anchor pins disposed in said aligned apertures in said dowel pins and said front sections, the rear section of said tubular truss member having a slot therein, a bolt slidably disposed in said truss member and having a projection attached thereto extending through said slot for manually sliding said bolt, the front section of said tubular truss member having an aperture therethrough, said bolt having an aperture therethrough, and a pin extending through the apertures in said tubular truss member and said bolt.

References Cited in the file of this patent

UNITED STATES PATENTS

| 297,153 | Muir | Apr. 22, 1884 |
| 569,354 | Ryan | Oct. 13, 1896 |
| 1,407,237 | Thompson et al. | Feb. 21, 1922 |
| 1,427,402 | Malec | Aug. 29, 1922 |
| 1,447,676 | Lewis | Mar. 6, 1923 |
| 1,743,332 | Ellsworth | Jan. 14, 1930 |
| 2,634,994 | Legassey et al. | Apr. 14, 1953 |